(12) United States Patent
Cruz

(10) Patent No.: US 9,351,442 B1
(45) Date of Patent: May 31, 2016

(54) LEAF COLLECTION APPARATUS AND METHOD UTILIZING AUTOMATED RAKING, BLOWING AND BAGGING TECHNIQUES

(71) Applicant: Omar Jesus Cruz, Hialeah, FL (US)

(72) Inventor: Omar Jesus Cruz, Hialeah, FL (US)

( * ) Notice: Subject to any disclaimer, the term of this patent is extended or adjusted under 35 U.S.C. 154(b) by 5 days.

(21) Appl. No.: 14/083,886

(22) Filed: Nov. 19, 2013

Related U.S. Application Data

(60) Provisional application No. 61/796,702, filed on Nov. 19, 2012.

(51) Int. Cl.
*A47L 5/00* (2006.01)
*A01D 51/00* (2006.01)

(52) U.S. Cl.
CPC ...................... *A01D 51/00* (2013.01)

(58) Field of Classification Search
CPC ... A01G 1/125; A01D 2101/00; A01D 34/71; A01D 42/08; A01D 43/0775; E01H 1/045
USPC .................. 15/4, 328, 339; 37/241, 242, 243; 239/663, 274, 289; 56/2, 16.4, 5, 328.1
See application file for complete search history.

(56) References Cited

U.S. PATENT DOCUMENTS

| | | | |
|---|---|---|---|
| 3,849,824 A | 11/1974 | Doering | |
| 4,217,672 A | 8/1980 | Olivari | |
| 4,453,375 A | 6/1984 | Field | |
| 4,597,203 A | 7/1986 | Middleton | |
| 5,317,860 A * | 6/1994 | Dunn | A01D 34/71 56/12.8 |
| 5,390,387 A * | 2/1995 | Dube | E01H 1/045 15/79.2 |
| 5,771,532 A * | 6/1998 | Munnoch | A47L 11/24 15/347 |
| 5,848,521 A * | 12/1998 | Kobayashi | A01G 1/125 15/340.4 |
| 6,070,290 A * | 6/2000 | Schwarze | A01B 45/00 15/340.1 |
| 6,484,483 B2 | 11/2002 | Martin | |
| 6,658,833 B2 * | 12/2003 | Dunning | A01G 1/125 56/16.6 |
| 7,191,485 B1 * | 3/2007 | Ramer | E01H 1/0872 15/34 |
| 7,752,706 B2 | 7/2010 | Goodger | |
| 7,810,202 B2 | 10/2010 | Fitzgerald | |
| 7,962,996 B1 | 6/2011 | Mondello | |
| 8,056,177 B2 | 11/2011 | Hammad | |
| 8,100,416 B1 | 1/2012 | Bloomfield | |
| 2006/0016167 A1 * | 1/2006 | Banowetz | A01G 1/125 56/344 |
| 2007/0220857 A1 | 9/2007 | Derby | |

* cited by examiner

*Primary Examiner* — Árpád Fábián-Kovács
(74) *Attorney, Agent, or Firm* — Glenn E. Gold; Gold & Rizvi, P.A.

(57) ABSTRACT

An apparatus for collecting leaves includes a mobile carrier and a leaf raking mechanism, hollow chute, blower unit and exhaust duct on the mobile carrier. The mobile carrier is movable forwardly over a surface during performance of leaf collection operations. Forced air flow produced by the blower unit is directed through the hollow chute from a rear end to a front end thereof past the leaf raking mechanism so as to create a vacuum effect in the hollow chute that assists the leaf raking mechanism in gathering leaves from the surface and delivering the leaves into the hollow chute where the leaves become entrained in the forced air flow directed to and through an outlet of the hollow chute and through the open top of a leaf collection bag, and into the bag, being disposed below the outlet of the hollow chute.

13 Claims, 9 Drawing Sheets

LEAF COLLECTION APPARATUS AND METHOD UTILIZING AUTOMATED RAKING, BLOWING AND BAGGING TECHNIQUES

CROSS REFERENCE(S) TO RELATED APPLICATION(S)

This U.S. Non-Provisional patent application claims the benefit of U.S. Provisional Patent Application No. 61/796,702, filed Nov. 19, 2012, which is hereby incorporated in its entirety herein by reference thereto.

FIELD OF THE INVENTION

The present invention generally relates to gathering leaves and, more particularly, is concerned with an apparatus and method for collecting leaves utilizing automated raking, blowing and bagging techniques.

BACKGROUND OF THE INVENTION

Gathering leaves fallen from trees is a burdensome repetitive chore in the fall of the year, impinging on other more enjoyable weekend activities, such as sports and recreational activities, outings, gardening and the like. The unavoidable necessity to devote weekend time to gathering fallen leaves brings about a desire to get each leaf gathering episode over and done with quickly and efficiently as possible. This desire means that more efficient approaches to gathering leaves are constantly being pursed.

Approaches to gathering leaves have typically ranged from hand raking leaves into piles and then manually stuffing leaves, taken from the piles, into leaf collection bags, to pushing a lawn sweeper across the lawn to pick up the leaves and cram them into the leaf collection bag while carried upside down on the sweeper, or to carrying a portable blower like a backpack with a wand tube connected to the blower that is held and directed by the carrier to blow the leaves into piles and then manually stuff the leaves, taken from the piles, into the leaf collection bags. Some of these approaches, more than others, have reduced the overall time spent in gathering leaves. However, these approaches still seem to fail to successfully combine the leaves gathering phase with the leaf collection bag filling phase in a way that relieves the amount of physical labor involved while concurrently enhancing the overall efficiency of the leaf collection operation itself.

Accordingly, there remains a need for an innovation that will overcome the failures of these approaches and resolve any problems that remain unsolved.

SUMMARY OF THE INVENTION

The present invention overcomes these failures and resolves problems that remain unsolved by providing an apparatus and method for collecting leaves utilizing automated raking, blowing and bagging techniques in an efficient manner with little physical labor other than the amount needed to push a mobile carrier of the apparatus across the ground surface where the leaves have fallen and accumulated, to remove a filled leaf collection bag, and re-install an empty bag. The present invention employs a single blower to provide a source of forced air flow that produces a forced air flow which is directed in confined manner so as to enable performance of a succession of tasks which makes leaf blowing and collection a more systematic operation wherein the fallen leaves are consolidated into a pile or row, then gathered therefrom and collected in bagged batches.

In one aspect of the present invention, an apparatus for collecting leaves comprises:

a mobile carrier configured to be supported on and moved at least in a forward direction over a surface, the mobile carrier at a front end thereof including a platform for supporting a leaf collection bag in an upright, rearwardly inclined, orientation;

a leaf raking mechanism supported by the mobile carrier at a bottom thereof between and spaced from a rear end and the front end thereof, the leaf raking mechanism extending in a transverse relation to the forward direction and being rotatably driven to gather leaves from the surface by moving the mobile carrier in the forward direction;

a hollow chute supported by the mobile carrier between the rear and front ends thereof in an inclined orientation being the reverse of the inclined orientation of the leaf collection bag when supported by the platform, the hollow chute comprising:

a bottom end portion disposed in overlying relation to the leaf raking mechanism and defining a bottom inlet in flow communication with the leaf raking mechanism, a rear portion disposed adjacent to, rearwardly of, and above the bottom end portion and defining a rear opening, and a top end portion disposed forwardly of, and above, the bottom end portion and the rear portion, protruding beyond the mobile carrier and defining a top outlet disposed proximate to an open top of the leaf collection bag when supported by the platform so as to thereby enable the open top of the leaf collection bag to be placed in flow communication with the top outlet of the chute;

a source of forced air flow supported by the mobile carrier and configured to direct a forced air flow through the hollow chute from the rear opening to the top outlet past the bottom inlet of the hollow chute so as to create a vacuum effect in the hollow chute that assists the leaf raking mechanism in gathering leaves from the surface and delivering the leaves into the hollow chute where the leaves become entrained in the forced air flow from the bottom inlet toward and through the top outlet of the hollow chute, and through the open top of and into the leaf collection bag; and a duct supported by the hollow chute along an exterior of the top end portion thereof so as to define an exhaust inlet, adjacent to the top outlet of the top end portion, being configured to receive a portion of the open top of the leaf collection bag thereover such that the duct provides a path for exhausting forced air flow from the collection bag to exterior of the leaf collection bag after circulating into and depositing the leaves in the leaf collection bag.

In another aspect of the present invention, an apparatus for collecting leaves comprises:

a mobile carrier configured to be supported on and moved at least in a forward direction over a surface, the mobile carrier at a front end thereof including a platform for supporting a leaf collection bag in an upright, rearwardly inclined, orientation;

a leaf raking mechanism supported by the mobile carrier at a bottom thereof between and spaced from a rear end and the front end thereof, the leaf raking mechanism extending in a transverse relation to the forward direction across the bottom of the mobile carrier and being rotatably driven to gather leaves from the surface by moving the mobile carrier in the forward direction;

a hollow chute supported by the mobile carrier between the rear and front ends thereof in an inclined orientation being the reverse of the inclined orientation of the leaf collection bag when supported by the platform, the hollow chute being disposed in flow communication with the leaf raking mechanism and protruding beyond the mobile carrier such that a top outlet of the hollow chute is disposed proximate to an open top of the leaf collection bag when the bag is supported by the platform so as to thereby enable the open top of the leaf collection bag to be placed in flow communication with the top outlet of the hollow chute;

an auxiliary tubular wand supported by and extending forwardly of the mobile carrier;

a blower unit supported by the mobile carrier and configured to produce a forced air flow, the blower unit being switchable to change the direction of forced air flow either to one or the other of the auxiliary tubular wand and hollow chute so as to convert the apparatus between a leaf blowing mode of operation, wherein the forced air flow is directed through the auxiliary tubular wand to move leaves on the surface to form either piles or rows thereof, or a leaf collection mode of operation, wherein the forced air flow is directed through the hollow chute past the leaf raking mechanism so as to create a vacuum effect in the hollow chute that assists the leaf raking mechanism in gathering leaves from the surface and delivering the leaves into the hollow chute where the leaves become entrained in the forced air flow directed to and through the top outlet of the hollow chute, and through the open top of and into the leaf collection bag; and an exhaust duct supported by the hollow chute along an exterior of a top end portion thereof so as to define an exhaust inlet, adjacent to the top outlet of the hollow chute, being configured to receive a portion of the open top of the leaf collection bag thereover such that the exhaust duct provides a path for exhausting forced air flow from the collection bag to exterior of the leaf collection bag after circulating into and depositing the leaves in the leaf collection bag.

In still another aspect of the present invention, a method for collecting leaves comprises the steps of:

supporting a leaf collection bag in an upright orientation at a front end of a mobile carrier;

producing a forced air flow;

rotating a leaf raking mechanism supported on the mobile carrier to gather leaves from a surface;

directing the forced air flow through a hollow chute supported on the mobile carrier from a rear end of the hollow chute past the leaf raking mechanism to an outlet at a front end of the hollow chute disposed adjacent to an open top of the leaf collection bag so as to create a vacuum effect in the hollow chute that assists the leaf raking mechanism in gathering leaves from the surface and delivering the leaves into the hollow chute where the leaves become entrained in the forced air flow directed to and through the outlet of the hollow chute and through the open top of and into the leaf collection bag; and exhausting the forced air flow from the leaf collection bag out through a portion of the top end thereof after the air flow circulates and deposits the leaves in the leaf collection bag.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE PREFERRED EMBODIMENTS

Figure 1:
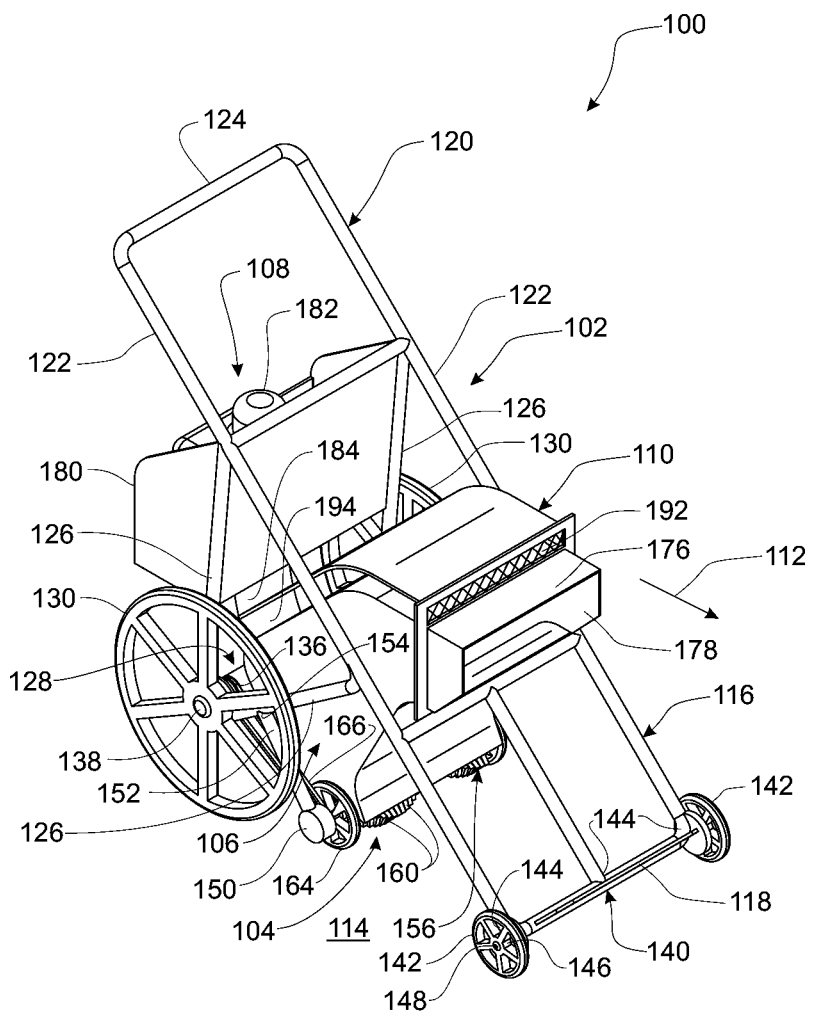
FIG. 1 presents a front isometric view of an exemplary embodiment of an apparatus for collecting leaves in accordance with the present invention.
Figure 2:
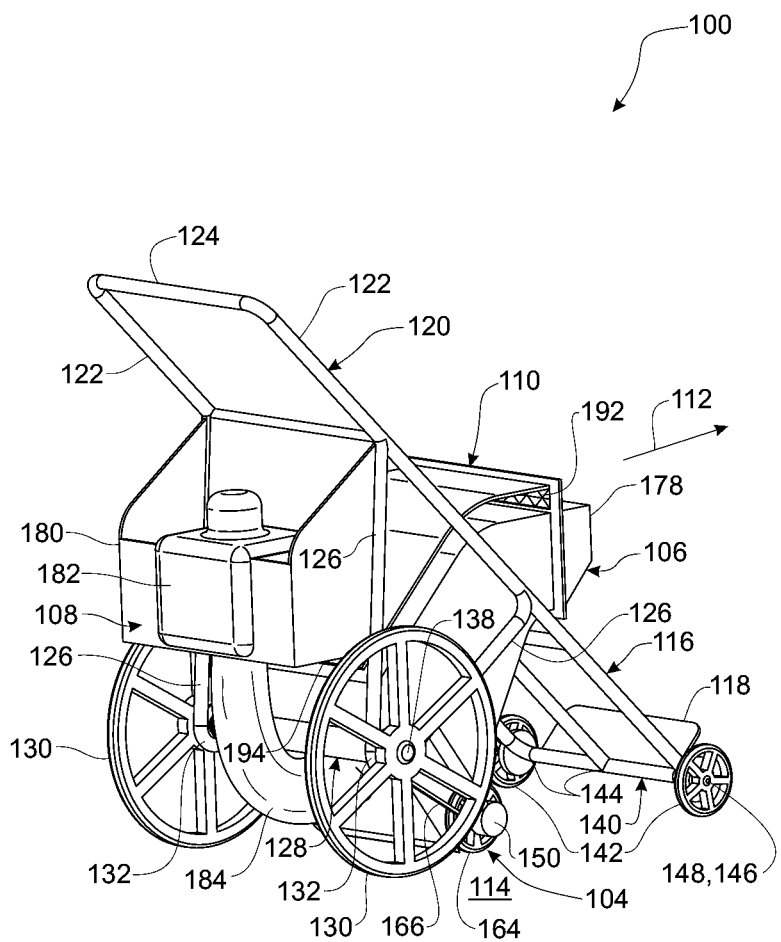
FIG. 2 presents a rear isometric view of the apparatus.
Figure 3:
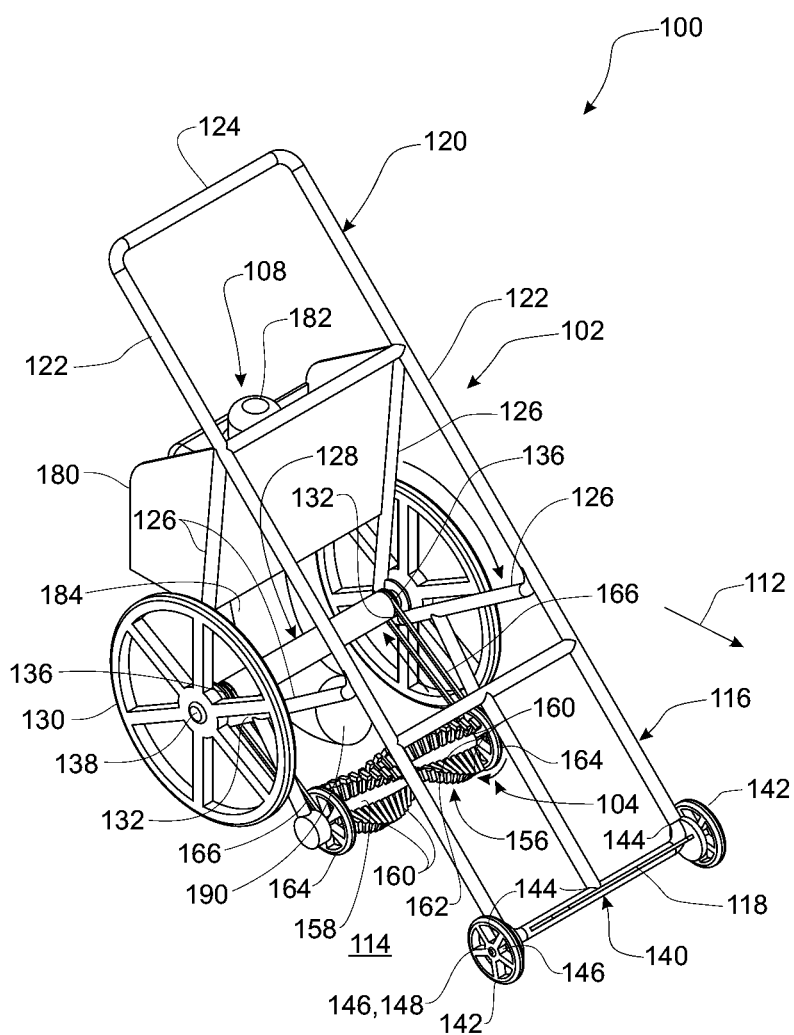
FIG. 3 presents a front isometric view of the apparatus, the view showing the apparatus without a hollow chute and an exhaust duct of the apparatus.
Figure 4:
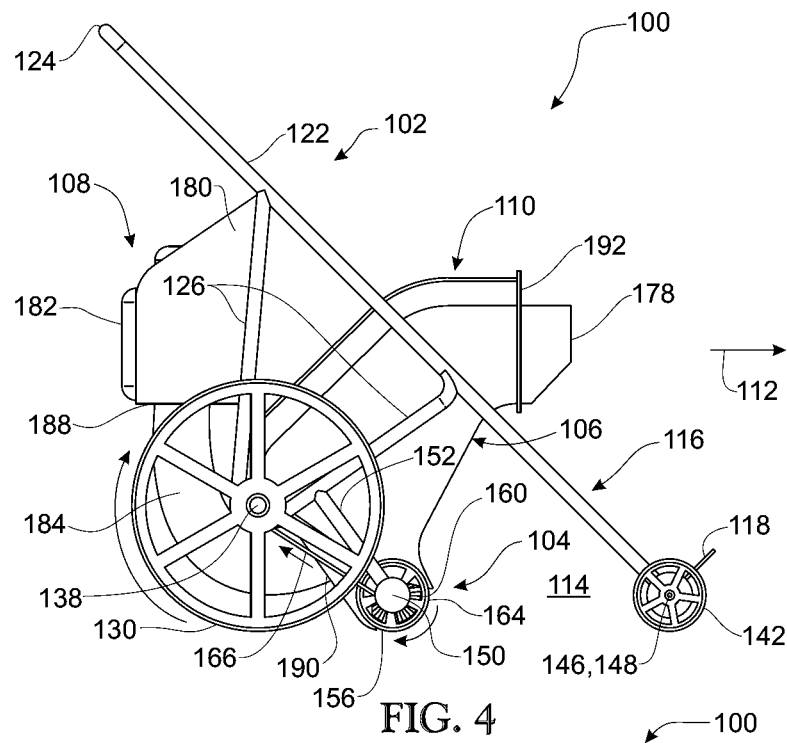
FIG. 4 presents a side elevation view of the apparatus.
Figure 5:
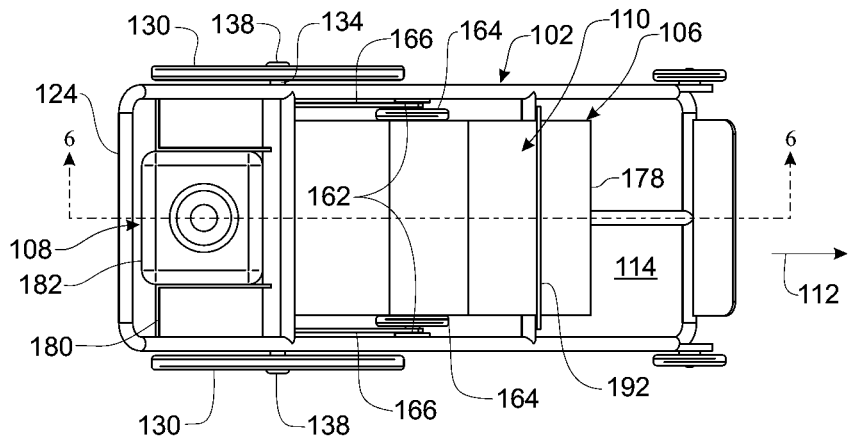
FIG. 5 presents a top view of the apparatus.
Figure 6:
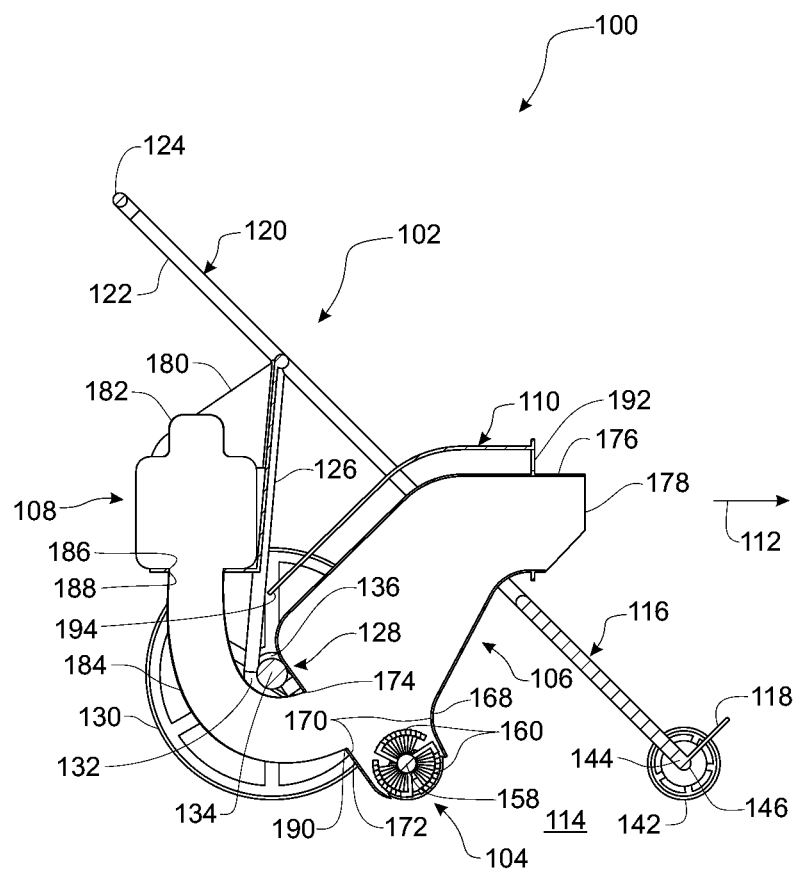
FIG. 6 presents a longitudinal sectional view of the apparatus taken along line 6-6 of FIG. 5.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "bottom", "top", "inside", "outside", "end", and derivatives thereof shall relate to the invention as oriented in FIGS. 1-3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 7:
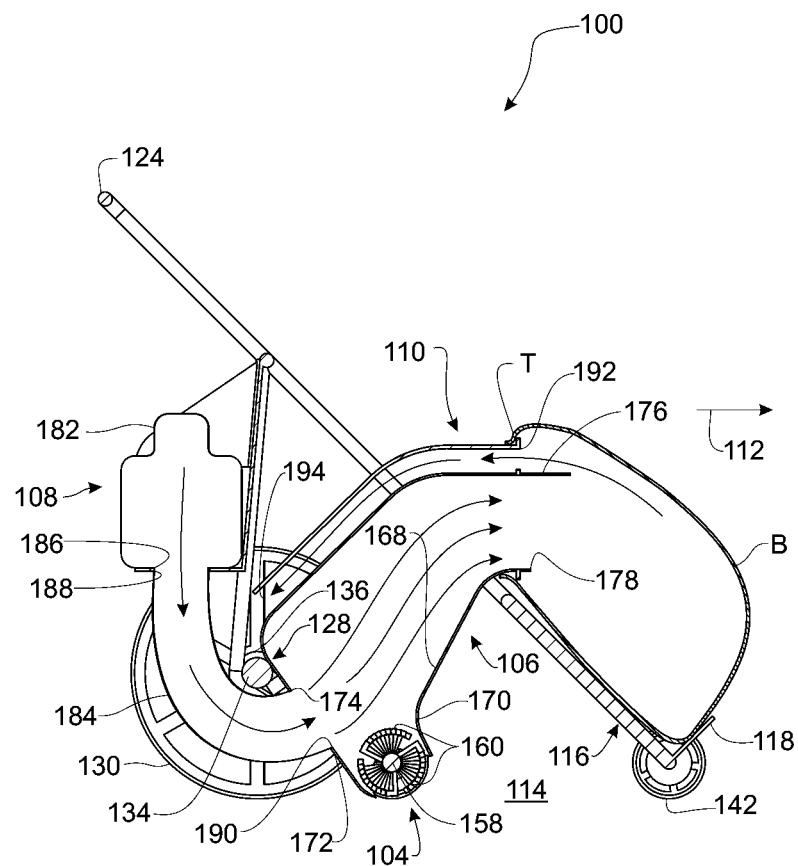
FIG. 7 presents a longitudinal sectional view of the apparatus similar to that of FIG. 6, but now showing a leaf collection bag attached to the apparatus and forced air flow lines showing the path of air flow through the apparatus during a leaf collection phase of its operation.

Referring now to FIGS. 1-7, there is illustrated an exemplary embodiment of an apparatus for collecting leaves, generally designated 100, in accordance with the present invention. It should be understood that the term "leaves" is being used in a generic sense to include other similar refuse materials and for purposes of convenience in referring to this range of materials that can also be acted upon by the apparatus and method of the present invention. The apparatus 100 basically includes a mobile carrier 102, a leaf raking mechanism 104, a hollow chute 106, a source 108 of forced air flow, and an exhaust duct 110. The mobile carrier 102 of the apparatus 100 is configured to be supported on and moved at least in a forward direction 112 over a surface 114, such as the ground surface on which leaves have fallen and accumulated, during performance of leaf collection operations. The mobile carrier 102 at a front end has a rearwardly inclined platform 116, with a bottom shelf 118, for supporting a leaf collection bag B in a generally upright, rearwardly inclined, orientation, as seen in FIG. 7. The bag B is typically made of a suitable plastic material. It should also be understood that the term "bag" is being used in a generic sense to include other similar enclosures and for purposes of convenience in referring to the range of enclosures that can also be utilized by the apparatus and method of the present invention.

More particularly, the mobile carrier 102 includes an upper frame 120 having a pair of laterally spaced apart side frame members 122 rigidly connected with and merging rearwardly and upwardly from the rearwardly inclined platform 116. The upper frame 120 terminates in a rear handlebar 124 extending transversely between and rigidly connected with the side frame members 122. The rear handlebar 124 is adapted to be gripped by an operator to push the mobile carrier 102 in the forward direction 112. The mobile carrier 102 also includes a pair of lower frames 126 each having a generally V-shaped configuration. The lower frames 126 are laterally spaced from one another and rigidly connected with and extend downwardly from the side frame members 122 of the upper frame 120. The lower frames 126 are spaced rearwardly from the rearwardly inclined platform 116 at the front end of the mobile carrier 102.

Also, the mobile carrier 102 includes a rear axle 128 and a pair of surface- or ground-engaging rear wheels 130. The rear axle 128 extends transversely between and is nested upon and fixedly connected to lower apexes 132 of the lower frames 126. The rear axle 128 internally has a rear shaft 134, being rotatable relative to the lower frames 126 of the mobile carrier 102, and a pair of drive elements for example in the form of sheaves 136 each disposed about and fixedly connected to the rear shaft 134 inwardly and adjacent to one of a pair of opposite ends 138 of the rear shaft 134 so as to rotate therewith. The rear wheels 130 are laterally spaced apart from each other and disposed adjacent outsides of the lower frames 126. The rear wheels 130 are mounted to the respective opposite ends 138 of the rear shaft 134 of the rear axle 128 adjacent to the drive elements or sheaves 136 so as to rotate the rear shaft 134 and drive sheaves 136 when the rear wheels 130 turn during movement of the mobile carrier 102. Thus, the rear wheels 130 also support the mobile carrier 102 for movement in the forward direction 112 across the ground surface 114 to perform the leaf collection operation when the operator grips the rear handlebar 124 and pushes the mobile carrier 102 in the forward direction 112.

Further, the mobile carrier 102 includes a front axle 140 and a pair of surface- or ground-engaging front wheels 142. The front axle 140 extends transversely between and is fixedly connected to the lower ends 144 of the rearwardly inclined platform 116. The bottom shelf 118 is fixedly attached along and extends outwardly from the front axle 140. The front axle 140 internally has a front shaft 146, being rotatable relative to the platform 116 of the mobile carrier 102. The front wheels 142 are laterally spaced apart from each other and attached to respective opposite ends 148 of the front shaft 146 of the front axle 140 so as to rotate therewith. The front wheels 142, which may swivel, support the front end of the mobile carrier 102 for movement across the ground surface 114 in a direction corresponding to the generally direction 112 in which the operator pushes the mobile carrier 102. The swivel capability of the front wheels 142 would allow the operator to turn the mobile carrier 102 either left or right.

The leaf raking mechanism 104 of the apparatus 100 is supported by the mobile carrier 102 between and spaced from the rear and front ends of the mobile carrier 102. The leaf raking mechanism 104 extends in a transverse relation to the forward direction 112 across the bottom of the mobile carrier 102. The leaf raking mechanism 104 also extends between and is rotatably supported at respective lower ends 150 of a pair laterally spaced apart, forwardly and downwardly extending, frame extension members 152 being rigidly connected at their respective rear ends 154 to the lower frames 126 at locations spaced forwardly and upwardly from the rear axle 128. The frame extension members 152 are located inside of the rear wheels 130 so as to support the leaf raking mechanism 104 between and adjacent forward-most portions of the rear wheels 130. As will be described hereinafter, the leaf raking mechanism 104 is rotatably driven to gather leaves by moving the mobile carrier 102 in the forward direction 112.

More particularly, the leaf raking mechanism 104 includes a generally cylindrical rotatable rake 156, which upon rotation is adapted to gather leaves from the ground surface 114. The rake 156 includes a cylindrical member 158 with rake fingers 160 extending from the exterior surface of the cylindrical member 158 in a staggered alignment. The leaf raking mechanism 104 also includes a pair of driven elements or sheaves 162 each disposed and fixedly connected to the cylindrical member 158 adjacent to a respective one of a pair of opposite ends thereof so as to rotate with the cylindrical member 158. The leaf raking mechanism 104 further includes a pair of surface- or ground-engaging idler wheels 164 mounted on the cylindrical member 158 between the driven sheaves 162 and the opposite ends of the cylindrical member 158. The idler wheels 164 merely support the rotatable rake 156 at a desired height above the ground surface 114, but do not actually drive rotation of the rake 156. The opposite ends of the cylindrical member 158 of the rake 156 are rotatably mounted to the lower ends 150 of the frame extension members 152. A pair of endless flexible members such as endless flexible belts 166 each extends between and about the drive sheaves 136 and driven sheaves 162 so as to drivingly couple and transfer rotation of the rear shaft 134 of the rear axle 128, driven by the rear wheels 130, to the rotatable rake 156 to cause rotation of the rake 156, as shown by the arrows in FIGS. 3 and 4. The rotation of the rear shaft 134 of the rear axle 128 causes rotation of the rotatable rake 156 at a substantially greater number of revolutions per minute than the rear wheels 130 due to the greater diameter of the rear wheels 130 compared to the diameter of the rotatable rake 156.

The hollow chute 106 of the apparatus 100 is an enclosed hollow body supported by the opposite ends of the rotatable rake 156 of the leaf raking mechanism 104 adjacent to the driven sheaves 162 thereof and by the rearwardly inclined platform 116 of the mobile carrier 102, between the rear and front ends of the mobile carrier 102 in an inclined orientation being the reverse of the inclined orientation of the leaf collection bag B when supported by the rearwardly inclined platform 116. The hollow chute 106 has a bottom end portion 168 disposed above and in an overlying relationship to the leaf raking mechanism 104 and defining a bottom inlet 170 in flow communication with the rotatable rake 156 of the leaf raking mechanism 104. The hollow chute 106 also has a rear portion 172 disposed adjacent to, rearwardly of, and above the bottom end portion 168 and defining a rear opening 174 located rearwardly of the bottom inlet 170 toward the forced air flow source 108. The hollow chute 106 further has a top end portion 176 disposed forwardly of, and above, the bottom end portion 168, bottom inlet 170 and rear portion 174 of the hollow chute 106, protruding beyond the mobile carrier 102 and defining a top outlet 178 disposed proximate to an open top T of the leaf collection bag B when supported by the rearwardly inclined platform 116 so as to thereby enable the open top T of the leaf collection bag B to be placed in flow communication with the top outlet 178 of the hollow chute 106.

The source 108 of forced air flow of the apparatus 100 is supported by the mobile carrier 102 and configured to direct a forced air flow, as represented by the flow lines and arrows in FIG. 7, from the forced air flow source 108, being located rearwardly of the hollow chute 106 and the leaf raking mechanism 104, through the hollow chute 106 from the rear opening 174 of the hollow chute 106 to the top outlet 178 of the hollow chute 106, going past the bottom inlet 170 of the hollow chute 106, being located between the rear portion 172 and top end portion 176 of the hollow chute 106 and in flow communication with the leaf raking mechanism 104, so as to create a vacuum effect in the hollow chute 106. The vacuum effect assists the rotatable rake 156 (and the rake fingers 160 thereon) of leaf raking mechanism 104 in gathering leaves from the surface 114 and delivering the gathered leaves through the bottom inlet 170 of the hollow chute 106 and into the hollow chute 106. In the hollow chute 106, the gathered and delivered leaves become entrained in the forced air flow being directed away from, and thus not through, the forced air flow source 108 and the rear opening 174 of the hollow chute 106 toward the top end portion 176 of the hollow chute 106 and through the top outlet 178 of the hollow chute 106, and therefrom through the open top T of and into the leaf collection bag B.

More particularly, a storage compartment 180 extends between and is supported by the lower frames 126 at the rear end of the mobile carrier 102 spaced below the rear handlebar 124 and between upper portions of the rear wheels 130. The storage compartment 180 has capacity to store a supply of the leaf collection bags B as well as tools, etc. which might be desirable to have on hand in case they are needed. The source 108 of forced air flow includes a blower unit 182 supported by the middle of the compartment 180 and an air flow directing pipe 184 in a communication relationship with the blower unit 182 and the hollow chute 106. The blower unit 182 may be the type having a motor operated by electrical power or an engine operated by fuel. The blower unit 182, having an inlet (not shown) and a lower outlet 186 is operable to draw an air flow in through the inlet and produce a forced air flow out through the lower outlet 186 and into a rear inlet 188 of the air flow directing pipe 184. The air flow directing pipe 184 is supported at its rear inlet end 188 from a bottom of the compartment 180 and has a curved configuration such that the pipe 184 extends downwardly and forwardly, below the rear axle 128, to a front outlet 190 of the pipe 184 located forwardly of the rear axle 128 where the pipe 184 is supported by the hollow chute 106 and connected in flow communication with the rear opening 174 thereof. The rear inlet 188 of the pipe 184, being in flow communication with the lower outlet 186 of the blower unit 182, receives the forced air flow from the blower unit 182 and directs the forced air flow to the front outlet 190 of the air flow directing pipe 184, through the rear opening 174 of the hollow chute 106 and into the hollow chute 106, as illustrated in FIG. 7.

The ventilation or exhaust duct 110 of the apparatus 100 is supported by the hollow chute 106 along an exterior of the top end portion 176 thereof so as to define an exhaust inlet 192, adjacent to the top outlet 178 of the top end portion 176. The exhaust duct 110 at its front exhaust inlet 192 is configured to receive a portion of the open top T of the leaf collection bag B thereover, as seen in FIG. 7, such that the duct 110 provides a path for exhausting forced air flow from the leaf collection bag B to exterior of the leaf collection bag B after circulating into and depositing the leaves in the leaf collection bag B. The exhaust duct 110 also extends rearwardly and downwardly along the exterior of the top end portion 176 to a rear exhaust outlet 194 that points downward instead of directly rearward toward the operator of the apparatus 100 and thereby functions as a ventilation shield guiding the air flow downward away from the operator, thus protecting the operator from impact with any residue carried by the air flow.

Any suitable means may be used to temporarily clamp or secure the open top T of the leaf collection bag B to the top end portion 176 adjacent the top outlet 178 of the hollow chute 106 and to the exhaust duct adjacent to the exhaust inlet 192. One example of such a device would be a bungee cord with hooks at its opposite ends which cord may be stretched and wrapped about the open top T of the bag B and secured there once the bag open top T has been fitted over the adjacent top outlet 178 and exhaust inlet 192. The hooks on the ends of the cord may readily and easily be unhooked to remove the core when the leaf collection bag B is full.

Figure 8:
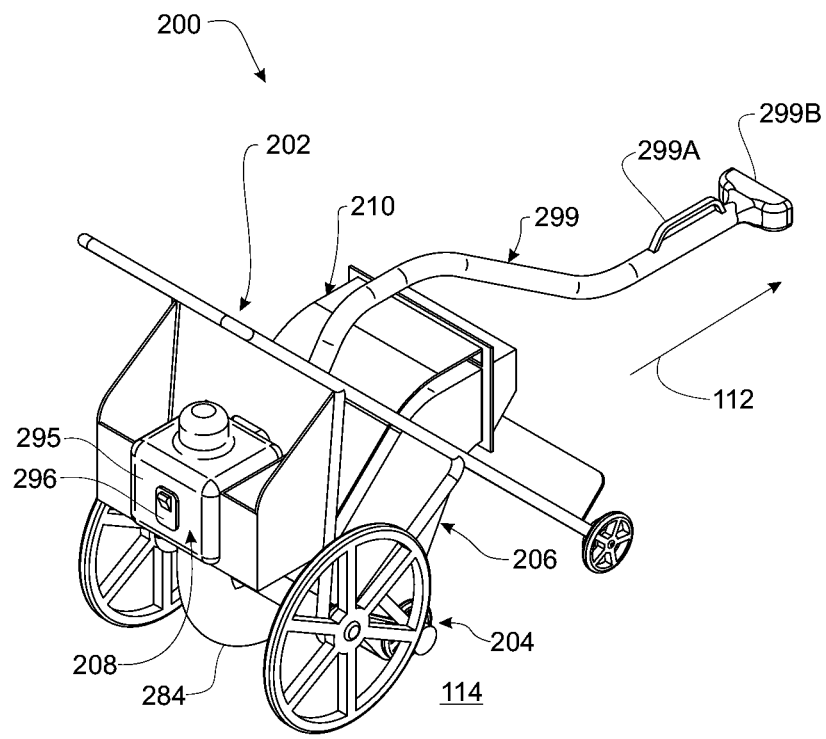
FIG. 8 presents a top rear isometric view of a modified embodiment of an apparatus for collecting leaves in accordance with the present invention which overall has the same basic components as in the exemplary embodiment of FIGS. 1-7, except for a modified blower unit now shown with a valve switch and a tubular wand installed thereon.
Figure 9:
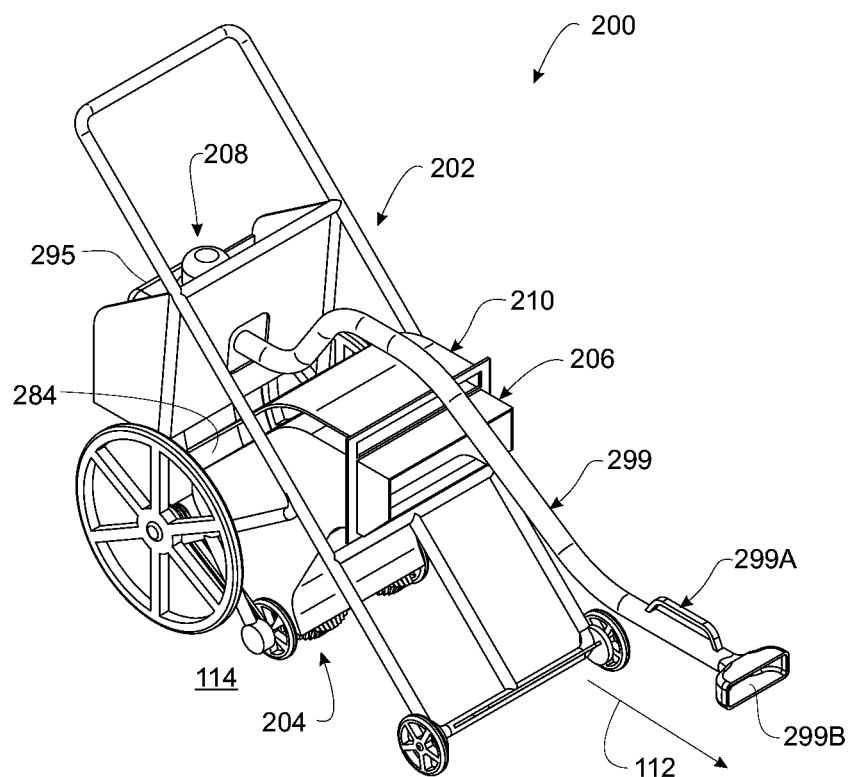
FIG. 9 presents a front isometric view of the modified embodiment of the apparatus showing another view of the tubular wand of the modified blower unit installed on the apparatus.
Figure 10:
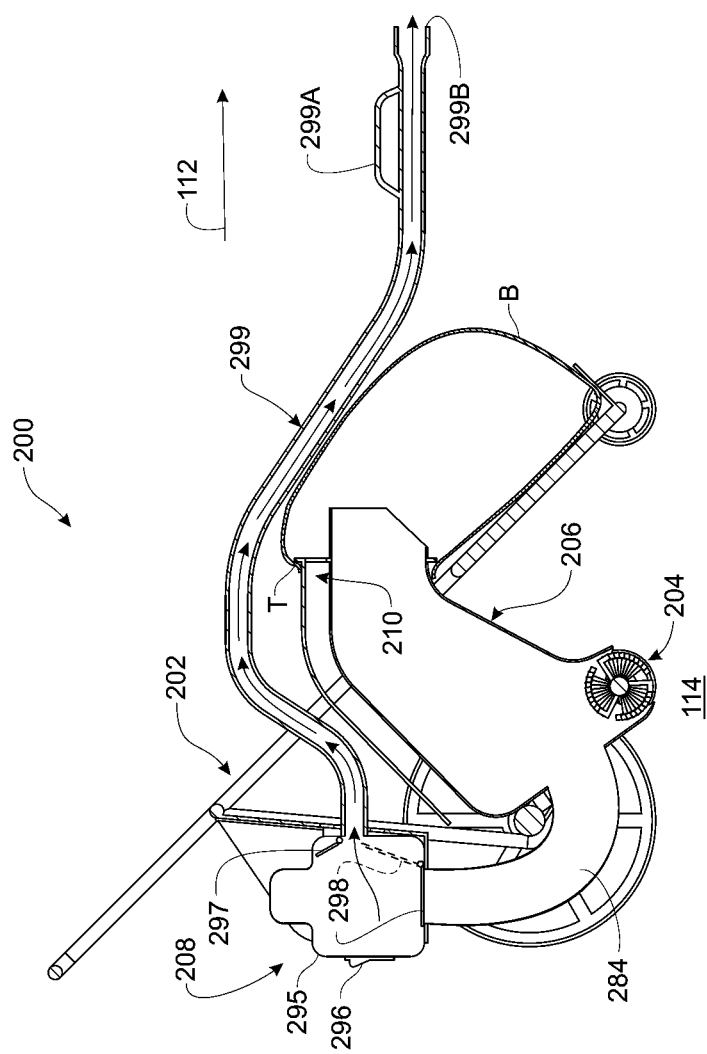
FIG. 10 presents a longitudinal sectional view of the modified embodiment of the apparatus similar to that of the exemplary embodiment of the apparatus of FIG. 7, but now with forced air flow lines and arrows showing the path of air flow through the apparatus during a leaf gathering phase of its operation.

Referring to FIGS. 8-10, there is shown a modified embodiment of the apparatus for collecting leaves in accordance with the present invention, the apparatus now being generally designated 200. The same reference numerals, except for a change in the prefix of the reference numerals from "1" to "2", indicate that overall the modified embodiment has the same basic components as the exemplary embodiment of the apparatus 100 shown in FIGS. 1-7. In other words, the modified embodiment of the apparatus 200 includes the same mobile carrier 202, leaf raking mechanism 204, hollow chute 206, source 208 of forced air flow, and exhaust duct 210. In view of this, the detailed description of these same basis components need not, and so will not, be repeated hereinafter in order for one to gain a complete understanding of the modified embodiment of the apparatus, generally designated 200.

More particularly, the apparatus 200 now utilizes a modified blower unit 295 having a valve switch 296 which may be actuated between two positions for changing the direction of forced air flow from the modified blower unit 295 by simultaneously opening or closing (or vice versa) the valve flaps 297, 298 which respectively lead to the air flow directing pipe 284, constituting as before a main forced air flow directing hose leading from the modified blower unit 295, and to a tubular wand 299, now constituting an auxiliary extension hose, installed on the modified blower unit 295. The tubular wand 299 has a handle 299A which allows the operator, once the valve switch 296 has been moved to the one of the two positions that converts the apparatus 200 to a leaf blowing mode of operation, to aim the wand 299 as desired in order to move the leaves on the ground surface 114 in the desired direction to form a pile or row of leaves. FIG. 10 shows a sequence of arrows that depict the forced air flow from the modified blower unit 295 with the valve flap 297 open and the valve flap 298 closed, which diverts all of the forced air flow through the tubular wand 299 and from its outlet end 299B.

Once the valve switch 296 is moved to the other of the two positions that converts the apparatus 200 to the previously described leaf collecting mode of operation, the tubular wand 299 may either be left in place as is or removed from the modified blower unit 295, since the tubular wand 299 will not now be employed during the leaf collecting mode of operation of the apparatus 200. As will be apparent to those skilled in the art, although tubular wand 299 is shown extending forwardly (in the direction of arrow 112) it can just as easily be configured to extend in other directions from the modified blower unit 295. In that regard, it may be actually be preferable to have tubular wand 299 extend from a sidewall of the modified blower unit 295 (and correspondingly through a sidewall of storage unit 180) such that the wand extends outwardly in a direction substantially perpendicular to the direction arrow 112 (as shown in the drawings). This may be preferable in order to ensure that the tubular wand 299 does not interfere with, for example, leaf collection bag B. The operator may now maneuver the mobile carrier 200 over the leaves to enable the leaf raking mechanism 204, hollow chute 206 and modified blower unit 295 function together to vacuum gather the leaves from the pile or row and deposit the leaves in the leaf collection bag B. Any suitable leaf collection bag that is able to fit at the hollow chute 206 and discharge duct 210 can be used, eliminating the need to transfer the leaves into another paper or plastic bag.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. An apparatus for collecting leaves, comprising:
   a mobile carrier configured to be supported on and moved at least in a forward direction over a surface, said mobile carrier at a front end thereof including a platform for supporting a leaf collection bag in an upright, rearwardly inclined, orientation;
   a leaf raking mechanism supported by said mobile carrier at a bottom thereof between and spaced from a rear end and said front end thereof, said leaf raking mechanism extending in a transverse relation to the forward direction across said bottom of the mobile carrier and being rotatably driven to gather leaves from the surface by moving said mobile carrier in the forward direction;
   a hollow chute supported by said mobile carrier between said rear and front ends thereof in an inclined orientation being the reverse of the inclined orientation of the leaf collection bag when supported by said platform, said hollow chute comprising:
      a bottom end portion disposed above and in an overlying relation to said leaf raking mechanism and defining a bottom inlet in flow communication with said leaf raking mechanism,
      a rear portion disposed adjacent to, rearwardly of, and above said bottom end portion and defining a rear opening located rearwardly of said bottom inlet, and
      a top end portion disposed forwardly of, and above, said bottom end portion, said bottom inlet and said rear portion, protruding beyond said mobile carrier and defining a top outlet disposed proximate to an open top of the leaf collection bag when supported by said platform so as to thereby enable the open top of the leaf collection bag to be placed in flow communication with said top outlet of said chute;
   a source of forced air flow supported by said mobile carrier and configured to direct a forced air flow from said forced air flow source, being located rearwardly of said hollow chute and said leaf raking mechanism, through said hollow chute from said rear opening of said hollow chute to said top outlet of said hollow chute, going past said bottom inlet of said hollow chute, being located between said rear portion and said top end portion of said hollow chute and in said flow communication with said leaf raking mechanism, so as to create a vacuum effect in said hollow chute that assists said leaf raking mechanism in gathering leaves from the surface and delivering the leaves through said bottom inlet of said hollow chute and into said hollow chute where the gathered and delivered leaves become entrained in the forced air flow being directed away from, and thus not through, said forced air flow source and said rear opening of said hollow chute toward said top end portion of said hollow chute and through said top outlet of said hollow chute; and
   an exhaust duct supported by said hollow chute and being configured to provide a path for exhausting forced air flow from the collection bag to exterior of the leaf collection bag after circulating into and depositing the leaves in the leaf collection bag.

2. The apparatus of claim 1 wherein said mobile carrier further comprises:
   an upper frame rigidly connected with and extending rearwardly and upwardly from said rearwardly inclined platform, said upper frame having a rear handlebar adapted to be gripped by an operator to push said mobile carrier in the forward direction; and
   lower frames spaced laterally from each other and rigidly connected with and extending downwardly from said upper frame, said lower frames spaced rearwardly from said platform at said front end of said mobile carrier.

3. The apparatus of claim 2 wherein said mobile carrier further comprises:
   a rear axle mounted to lower ends of said lower frames, said rear axle having a rear shaft being rotatable relative to said lower frames; and
   a pair of drive elements each disposed about and fixedly connected to said rear shaft inwardly and adjacent to one of a pair of opposite ends of said rear shaft.

4. The apparatus of claim 3 wherein said mobile carrier further comprises a pair of surface-engaging rear wheels laterally spaced apart from each other and disposed adjacent to said lower frames, said rear wheels being mounted to said respective opposite ends of said rear shaft adjacent said drive elements so as to support said mobile carrier for movement in the forward direction and to rotate said rear shaft and drive elements when said rear wheels turn during movement of said mobile carrier.

5. The apparatus of claim 3 wherein said raking mechanism further comprises:
   a rotatable rake which upon rotation is adapted to gather leaves from the surface; and
   a pair of driven elements each disposed and fixedly connected to one of a pair of opposite ends of said rake so to as to rotate therewith.

6. The apparatus of claim 5 wherein said rotatable rake further comprises:
   a rotatable cylindrical member having opposite ends at which said cylindrical member is rotatably mounted to lower ends of said lower frames, said driven elements being fixedly connected to said respective opposite ends of said cylindrical member so as to rotate therewith; and rake fingers extending from an exterior surface of said cylindrical member in a staggered alignment.

7. The apparatus of claim 6 wherein said raking mechanism further comprises a pair of surface-engaging idler wheels mounted on said cylindrical member between said driven elements and said opposite ends of said cylindrical member such that said idler wheels support said rotatable rake at a desired height above the surface but not drive rotation of said rotatable rake.

8. The apparatus of claim 5 wherein said mobile carrier further comprises a pair of endless flexible members each extending between and drivingly coupling one of said pair of drive elements of said rear axle with one of said pair of driven elements of said leaf raking mechanism.

9. The apparatus of claim 8 wherein said mobile carrier further comprises a pair of surface-engaging rear wheels laterally spaced apart from each other and disposed adjacent to said lower frames, said rear wheels being mounted to said respective opposite ends of said rear shaft adjacent said drive elements so as to rotate said rear shaft and drive elements upon turning of said rear wheels during movement of said mobile carrier in the forward across ground surface when an operator grips said rear handlebar and pushes said mobile carrier, said rotation of said rear shaft by said rear wheels causes said rotatable rake to rotation at a greater number of revolutions per minute than said rear shaft and said rear wheels due the greater diameter of said rear wheels compared to the diameter of said rotatable rake.

10. The apparatus of claim 9 wherein said source of forced air flow further comprises:
 a compartment supported by said lower frames between and extending above upper portions of said rear wheels; and
 a blower unit supported on said compartment and configured to produce the forced air flow.

11. The apparatus of claim 10 wherein said source of forced air flow further comprises an air flow directing pipe having a curved configuration with a rear inlet end and a front outlet end and being supported at said rear inlet end from a bottom of said compartment such that said air flow directing pipe extends downward and forward, below said rear axle, to said front outlet of said air flow directing pipe located forwardly of said rear axle, said air flow directing pipe being connected at said rear inlet thereof in flow communication with a lower outlet of said blower unit so as to receive said forced air flow from said blower unit and direct said forced air flow to said front outlet of said air flow directing pipe and through said rear opening of said hollow chute.

12. The apparatus of claim 1 wherein said mobile carrier further comprises:
 a front axle extending transversely between and fixedly connected to a lower end of said rearwardly inclined platform said collection bag supporting portion, said front axle having a front shaft being rotatable relative to said platform; and
 a pair of front wheels laterally spaced apart from each other and attached to opposite ends of said front shaft of said front axle so as to rotate therewith and support said front end of said mobile carrier for movement across ground surface in a direction corresponding to the direction in which the operator pushes said mobile carrier.

13. The apparatus of claim 12 wherein said platform further comprises a bottom shelf for supporting the leaf collection bag thereon.

* * * * *